May 27, 1969  J. D. GINER  3,446,674
METHOD AND APPARATUS FOR CONVERTING
HYDROGEN-CONTAINING FEEDSTOCKS
Filed July 7, 1965

INVENTOR.
JOSE D. GINER

BY
Charles A. Warren

ATTORNEY

000
United States Patent Office 3,446,674
Patented May 27, 1969

3,446,674
METHOD AND APPARATUS FOR CONVERTING HYDROGEN-CONTAINING FEEDSTOCKS
Jose D. Giner, Glastonbury, Conn., assignor to United Aircraft Corporation, East Hartford, Conn., a corporation of Delaware
Filed July 7, 1965, Ser. No. 470,096
Int. Cl. H01m 27/06
U.S. Cl. 136—86　　　　　　　　　　　　　　18 Claims

ABSTRACT OF THE DISCLOSURE

There is disclosed an electrochemical converter which is a part of a fuel cell assembly wherein a cathode member is spaced to the opposite side of the cathode membrane from said anode and an electrolyte is provided therebetween. An external circuit connected to a load is provided between the anode and the cathode member to provide current flow therebetween as a result of the oxidation-reduction reaction occurring within the cell assembly. A power source is connected between the cathode membrane and either the cathode member or the anode with the cathode membrane being the cathode in the secondary circuit to produce electron flow thereinto and compensate for any leak in the system.

---

The present invention relates to the conversion of hydrocarbons and other hydrogen-containing feedstocks to hydrogen, and more particularly to an electrochemical method and apparatus for the conversion of hydrogen-containing feedstocks to hydrogen for use in fuel cells and the like, and to fuel cell assemblies employing the same.

There has been extensive activity in the development of devices for the direct conversion of chemical energy into electrical energy. Generally, an oxidation-reduction reaction occurs in a cell provided with spaced electrodes and an intermediate electrolyte and the electrodes are connected to an external circuit providing an electrical load. In this manner, it is possible to convert electrochemically a major portion of the energy of the chemical reaction between reactants continuously supplied to the electrodes directly into electrical energy for use in the external circuit. Although it has been proposed to utilize other materials as the fuel in such fuel cells, hydrogen has generally been recognized as the preferred reactant or fuel and its coreactant has generally been oxygen, conveniently in air, with the two reactants being supplied respectively to the anode and cathode.

Various techniques have been proposed for continuously generating hydrogen for use in such fuel cells including the electrochemical means disclosed in Rightmire United States Patent No. 3,092,516 and a proposed integrated catalytic conversion suggested in the recently issued Beals United States Patent No. 3,177,097. In addition, high and medium temperature catalytic dehydrogenation processes have also been explored as indicated by the recently published literature.

It is an object of the present invention to provide a novel apparatus for continuously converting hydrogen-containing gaseous feedstocks into substantially pure hydrogen and which is operable at relatively low temperatures and may be readily coupled to a fuel cell.

It is also an object of the present invention to provide a highly compact electrochemical conversion cell for hydrogen-containing feedstocks which may be readily fabricated and is relatively free from operating difficulties.

Another object is to provide a relatively compact and efficient fuel cell assembly having integrated therein a novel electrochemical conversion cell for hydrogen-containing feedstocks.

Still another object is to provide a method for the rapid and efficient conversion of hydrogen-containing feedstocks to hydrogen either in combination with a direct energy conversion reaction or for producing hydrogen for storage.

Other objects and advantages will be readily apparent from the following detailed specification and claims and the attached drawing wherein:

Figure 1:
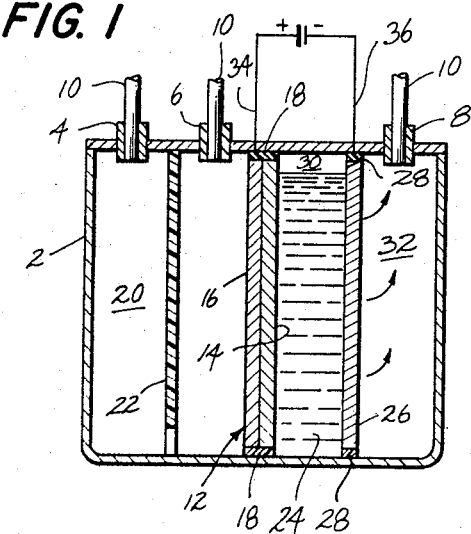
FIGURE 1 is a diagrammatic representation of one form of conversion apparatus embodying the present invention.

It has now been found that the foregoing objects and advantages may be readily attained in an electrochemical converter having an anode providing a dehydrogenation catalyst and permeable to the hydrogen ions formed thereat and a cathode membrane spaced from the anode and fabricated from a metal selectively permeable to hydrogen. An electrolyte is disposed between the anode and the cathode membrane and a power supply is connected to the anode and cathode membrane to complete a circuit therebetween. A gaseous mixture such as hydrocarbon and steam, which passed into contact with the anode undergoes a reaction under the influence of the dehydrogenation catalyst and current which produces hydrogen ions and carbon dioxide. The hydrogen ions pass through the electrolyte to the cathode membrane where they accept electrons to form atomic hydrogen which then diffuses through the cathode membrane so that the gas collected from the opposite side of the cathode membrane is substantially pure hydrogen.

Although various metals evidence degrees of selective permeability to hydrogen, only palladium and its alloys have achieved much practical application as a means for purification of hydrogen. Although substantially pure palladium generally is effective for this purpose, it tends to become brittle when saturated with hydrogen so that alloys thereof have enjoyed far more acceptance. The preferred alloying element for this purpose is silver although boron also has been employed satisfactorily. Generally the membranes most widely used and those contemplated for the present invention vary in thickness from about 0.1 to 5.0 mils with a preferred thickness from the standpoint of speed and reliability of operation and fabrication being about 0.2 to 0.5 mil.

Although various structures may be employed for fabricating the anode, a highly advantageous arrangement has been provided by the use of a conductive metal screen which is coated with a suitable dehydrogenation catalyst composition to provide the catalyst between the wires. In this manner, the current may be readily conducted throughout, and the structure provides facile flow of the hydrogen ions produced by the dehydrogenation reaction into the electrolyte. To avoid flooding of the anode by the electrolyte, the screen is desirably treated with a hydrophobic material such as tetrafluoroethylene resin. However, it is readily apparent that other structures may be employed for fabricating the anode, including metal elements inherently permeable to gases such as the porous electrode structure disclosed in Bacon United States Patent No. 2,928,783 or perforated so as to permit passage of gases therethrough. The metal may be inherently catalytic such as palladium and platinum and/or it may have its surface treated or coated so as to impart the desired dehydrogenation catalytic activity thereto.

Although a chamber containing liquid electrolyte may be provided between the anode and cathode membrane, a highly efficient and trouble-free assembly has been provided by the use of a porous absorbent matrix member which may be saturated with the electrolyte to provide a conductive path between the anode and the cathode membrane. Although various materials may be employed for this purpose, mats of inorganic fibers such as quartz and glass which are relatively inert to the flow of current therethrough and to the electrolyte are most desirably employed. These mats may vary in thickness, but desirably fall within the range of 5 to 60 mils, and preferably about 10 to 30 mils in order to provide sufficient electrolyte without excessive resistance. The porosity similarly may vary, but high porosity commensurate with adequate strength and retention is generally advantageous to ensure adequate electrolyte for efficient passage of the hydrogen ions therethrough. Generally, the porosity of the matrices should fall within the range of 30 to 75 percent, and preferably within the range 45 to 65 percent.

To ensure firm conductive contact between such a matrix member and the anode and cathode membrane, pressure plates preferably fabricated of synthetic resin are disposed to apply pressure against the outer surfaces of the anode and cathode membrane and are provided with suitable passages for the gas in contact with the anode and cathode membrane. These passages may be provided by grooves extending continuously along the surface of the plates or by apertures extending therethrough, or combinations thereof depending upon the physical configuration of the assembly employed for the converter.

Various gaseous fuels may be supplied to the converter to produce the desired hydrogen including saturated and unsaturated hydrocarbons, oxygenated organics such as alcohols, and ammonia. The electrolyte will of course vary with the fuel selected as generally will the nature of the catalysts employed.

The reaction taking place in the converter with a hydrocarbon fuel is readily understood by reference to the following equations:

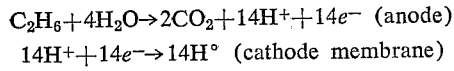

$$C_2H_6 + 4H_2O \rightarrow 2CO_2 + 14H^+ + 14e^- \text{ (anode)}$$

$$14H^+ + 14e^- \rightarrow 14H^\circ \text{ (cathode membrane)}$$

Generally only a small potential difference is required to produce the desired reaction, for example 180–400 millivolts being generally satisfactory, and preferably 200–300 millivolts. The current density will, of course, depend upon the potential employed and will vary between about 50–150 milliampers per square centimeter.

It has been found that the converter of the present invention may be included within a fuel cell assembly affording significant advantages in terms of the compactness and ease of operation since the cathode membrane of the converter will not only purify the hydrogen evolved in the converter portion but also may act as the anode for the fuel cell portion. In such a fuel cell assembly, a cathode member is provided to the opposite side of the cathode membrane and a suitable alkaline electrolyte is provided therebetween. Thus, the hydrogen ion formed at the fuel cell side of the cathode membrane reacts with hydroxyl ion formed at the cathode member by an oxygen-containing gas such as air to produce water. The cathode member of the fuel cell portion and the anode of the converter portion are coupled through an external circuit providing a load. A secondary circuit is coupled to the cathode membrane to furnish a small amount of current sufficient to compensate for hydrogen loss and corrosion, either by shunting a portion of the generated power thereto or a circuit may be completed between the cathode membrane and anode from a secondary power source. The potential required for the hydrocarbon conversion reaction to replace hydrogen loss is far below that generated in the oxidation reaction of the fuel cell so that there is a considerable surplusage which may be used to power the conversion reaction of additional fuel cell assemblies or which may be tapped for operating suitable devices.

If no external power supply is provided between the anode and the cathode membrane, the inherent loss in hydrogen at the cathode membrane caused by corrosion and hydrogen escaping will produce a decrease in the concentration of the hydrogen within the cathode membrane and ultimately destroy the system. Since this loss of hydrogen is cumulative, the small external current avoids this deteriorating effect upon the cathode membrane and permits continuous operation over extended periods of time. In practice, a secondary current of about 0.1 to 3.0 milliamperes per square centimeter to the cathode membrane has been satisfactory for a fuel cell assembly which will readily generate 60 to 500 milliamperes per square centimeter with a power output of 0.7 to 0.8 volt at 100 milliamperes per square centimeter.

The reactions taking place in a composite fuel cell are illustrated below:

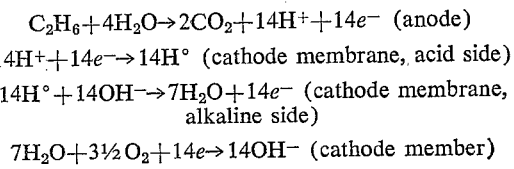

$$C_2H_6 + 4H_2O \rightarrow 2CO_2 + 14H^+ + 14e^- \text{ (anode)}$$

$$14H^+ + 14e^- \rightarrow 14H^\circ \text{ (cathode membrane, acid side)}$$

$$14H^\circ + 14OH^- \rightarrow 7H_2O + 14e^- \text{ (cathode membrane, alkaline side)}$$

$$7H_2O + 3\tfrac{1}{2}O_2 + 14e^- \rightarrow 14OH^- \text{ (cathode member)}$$

Referring now in detail to the attached drawing, illustrated in FIGURE 1 is a converter embodying the present invention wherein there is provided a cell housing 2 with fittings 4, 6 and 8 seating synthetic plastic tubes 10. A porous electrode, generally designated by the numeral 12, is comprised of a fine pore layer 14 and a coarse pore layer 16 impregnated with a dehydrogenation catalyst indicated by the stippling and is spaced from the cell housing 2 by the insulators 18. Dividing the compartment 20 defined between the coarse pore layer 16 and the wall of the housing 2 is a baffle plate 22 of synthetic plastic material with apertures in the bottom end thereof for passage of gas therethrough.

Spaced from the fine pore layer 14 of the porous electrode 12 is a palladium-silver alloy membrane 26 which is permeable to hydrogen. The membrane 26 is spaced from the housing 2 by the insulators 28 and divides the housing to the side of the fine pore layer into two compartments 30 and 32. Disposed within the compartment 30 is an electrolyte 24 and electrical leads 34, 36 from a suitable power supply are connected to the coarse pore layer 16 of the porous electrode 12 and the palladium-silver membrane 26 to constitute the porous electrode 12 as an anode and the membrane 26 as a cathode.

In the operation of this embodiment a gaseous mixture of hydrocarbon and steam is introduced into the compartment 20 through the plastic tube 10 in the fitting 6 and passes along the surface of the catalyst-impregnated coarse pore layer 16 of the porous electrode 12 where, under the influence of the catalyst and current passing therethrough, the components are reacted to produce carbon dioxide and hydrogen ions which diffuse through the porous electrode 12 and thence travel through the electrolyte 24 in the compartment 30 to the cathode provided by the palladium-silver membrane 26 under the influence of the current passing therethrough. At the membrane 26, the hydrogen ions accept electrons and are converted into atomic hydrogen which diffuses through the palladium-silver membrane 26 into the compartment 32 wherein the atomic hydrogen combines to form molecular hydrogen which then exits through the tube 10 in the fitting 8 to a fuel cell or suitable collection vessel (not shown). Unreacted hydrocarbon and steam as well as the product carbon dioxide pass through the baffle plate 22 and thence outwardly through the tube 10 in the fitting 4.

Figure 2:
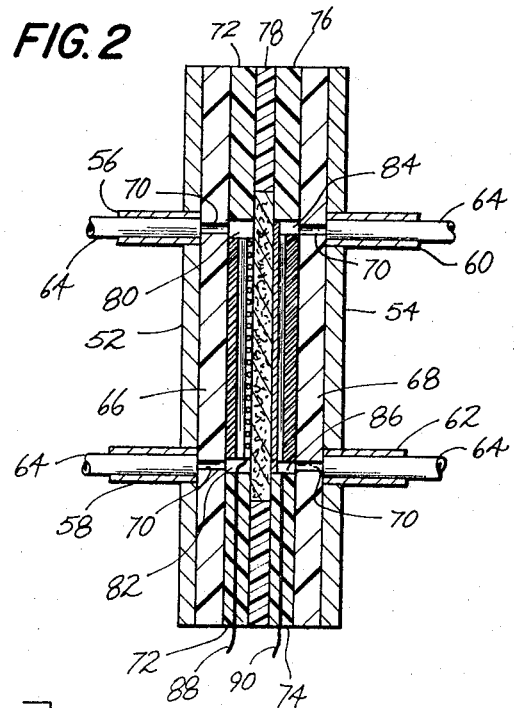
FIGURE 2 is a diagrammatic representation of another form of apparatus embodying the present invention.
Figure 3:
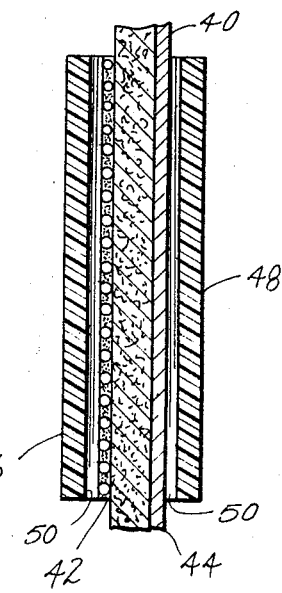
FIGURE 3 is an enlarged diagrammatic representation of the electrode assembly portion of the apparatus of FIGURE 2.

Referring now to the embodiment illustrated in FIGURES 2 and 3, a more compact arrangement is provided by a reformer cell with an electrode assembly best seen in FIGURE 3 and having a porous matrix member 40 saturated with electrolyte. An anode 42 provided to one side thereof is comprised of a conductive wire screen pasted with a dehydrogenation catalyst. To the opposite side thereof is a cathode 44 formed of a palladium-silver alloy membrane which is permeable to hydrogen. Pressure plates 46, 46 of synthetic resin having longitudinal grooves 50 formed therein are disposed against the outer surfaces of the electrodes 42, 44 to hold them firmly against the matrix member 40 and to permit the reactant gases to travel into contact therewith and the product gases to escape therefrom.

As seen in FIGURE 2, this electrode assembly is assembled within the housing comprised of the metal body plates 52, 54 which are secured together by threaded fasteners such as bolts (not shown) and are provided with fittings 56, 58, 60 and 62 adjacent the ends of the electrode assembly which seat tubes 64 of synthetic resin. Disposed outwardly of the pressure plates 46, 48 are plates 66, 68 of synthetic resin with apertures 70 registering with the fittings 56, 58, 60 and 62. The electrode assembly is received within cooperatively dimensioned apertures formed in the body plates 72, 76 and the matrix spacer plate 78, all fabricated from synthetic resin which thus complete the housing assembly in cooperation with the plates 66, 68 and body plates 52, 54.

As can be seen in the illustration of FIGURE 2, the matrix member 40 is of longer length than the electrodes 42, 44 and the apertures in the body plates 72, 76 are larger than the pressure plates 46, 48 so as to provide chambers 80, 82, 84, 86 about the electrodes 42, 44 which in turn communicate with the tubes 64 through the apertures 70 in the plates 66, 68. The membrane 44, however, desirably snugly seats within the aperture in the plate 76 and may be more firmly held about its ends by having the pressure plate 48 coextensive therewith and peripherally apertured to permit passage of gases outwardly from the grooves 50 therein. Electrical leads 88 and 90 to the electrodes 42, 44 extend through the body plates 72, 74 to complete an electrical circuit therebetween from a power supply (not shown).

In the operation of this embodiment, a gaseous mixture of hydrocarbon and steam is fed into the tube 64 of the fitting 56 and into the chamber 80 when it travels through the grooves 50 of the pressure plate 46 along the surface of the anode 42 in contact with the catalyst therein. Under the influence of the catalyst and the current, a reaction takes place in which the hydrocarbon and steam are reacted and converted into hydrogen ion and carbon dioxide. Unreacted hydrocarbon and steam as well as the product carbon dioxide pass through the grooves 50 into the chamber 82 and thence outwardly through the tube 64 in the fitting 58 while the hydrogen ions generated by the reaction pass through the electrolyte-saturated matrix member 40 and into contact with the palladium-silver membrane cathode 44 where they accept electrons to form atomic hydrogen which diffuses therethrough. The atomic hydrogen then combines into molecular hydrogen which travels in the grooves 50 of the pressure plate 48 to the chambers 84, 86 at the ends thereof and thence outwardly through the tubes 64 in the fittings 60, 62 to a fuel cell or suitable storage device (not shown).

Figure 4:
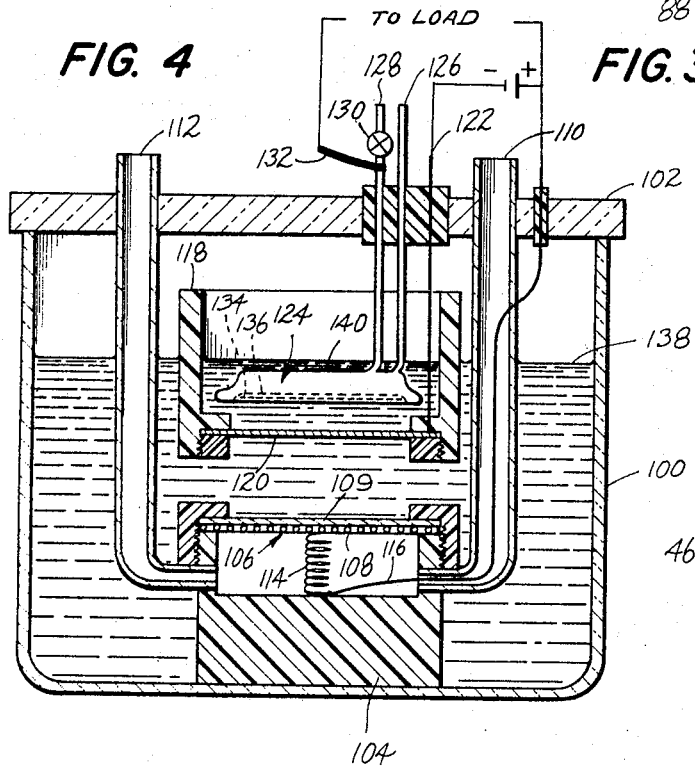
FIGURE 4 is a diagrammatic representation of an integrated fuel cell assembly embodying an electrolyte conversion apparatus in accordance with the present invention.

Referring now to the embodiment of FIGURE 4, therein illustrated is a cell having a glass body 100 and a glass cover 102. Seated on the bottom thereof is a lower electrode holder 104 of synthetic plastic material having clamped therein an anode assembly generally designated by the numeral 106 and provided by a matrix member 109 and a metal screen 108 pasted with a dehydrogenation catalyst. An inlet tube 110 extends through the cover 102 and into one side of the electrode holder 104 and an outlet tube 112 extends from the other side thereof through the cover 102. The anode screen 108 is connected to a power supply through the lead 116 and the spring 114 which serves to hold the anode 108 tightly against the matrix member 109.

Spaced above the lower electrode holder 104 is an upper electrode holder 118 which carries a cathode membrane 120 of a metal selectively permeable to hydrogen and a lead 122 from a power supply (not shown) is connected thereto. Spaced above the cathode membrane 120 is a unitized Bacon-type cathode generally designated by the numeral 124 which has an air inlet 126 and a product outlet 128 extending therefrom and outwardly through the cover 102 with a valve 130 to control the pressure within the body of the cathode 124. The cathode 124 has an active lower surface provided by porous nickel layers 134 and 136, with the layer 136 being catalytically active and of coarser pore size, and flow passages are provided therewithin for channeling the gases to and from the nickel layers 134, 136. A lead 132 to the cathode 124 is attached to the outlet 128 to complete the circuit therewith. A suitable acid electrolyte 138 is disposed within the main body of the housing but is operated from the Bacon cathode 124 by the cathode membrane 120 and the electrode holder 118 and the Bacon-type cathode 124 is immersed within an alkaline electrolyte 140 contained within the electrode holder 118 and cathode membrane 120.

In the operation of this embodiment, a gaseous mixture of hydrocarbon and moisture vapor is supplied through the inlet tube 110 and passes into contact with the anode 108. Under the influence of the catalyst and current, a reaction takes place to produce carbon dioxide which exits through the outlet 112 and hydrogen ions which pass through the matrix member 109 into the body of electrolyte 138. The hydrogen ions travel to the cathode membrane 120 where they accept electrons and diffuse therethrough to the opposite side thereof where they yield electrons in the alkaline electrolyte, the membrane 120 thus acting as the cathode for the conversion reaction and the anode for the fuel cell reaction. Simultaneously, air or other oxygen-containing gas is introduced into the Bacon-type cathode 124 through its inlet 126 and is brought into contact with the catalytically active nickel layer 136 to produce an oxidation reaction wherein electrons are accepted by the oxygen and hydroxyl ions are formed. Unreacted air and vapor exits through the outlet 128 and the pressure within the electrode may be readily controlled by the valve 130 thereon. The load is applied across the Bacon-type cathode 124 and the hydrocarbon anode 108 and a secondary circuit with a small current flowing therethrough is completed between the anode 108 and the membrane 120 to compensate for corrosion or hydrogen loss in the membrane 120 as hereinbefore described.

Although the auxiliary circuit is shown coupled between the hydrocarbon anode and the cathode membrane in the illustrated fuel cell assembly, it may also be connected between the cathode membrane and the cathode member of the fuel cell portion so long as the cathode membrane remains the cathode in the secondary circuit so that electrons are introduced thereinto to compensate for hydrogen loss and corrosion.

Although it has not been specifically described hereinbefore, it will be readily apparent that the cathode membrane desirably is catalytically coated to enhance its ability to adsorb hydrogen ions and effect electron exchange. Generally the surfaces thereof are activated by electroplating palladium-black thereon to enhance the catalytic activity of the surface.

Bacon-type cathodes using dual layers of porous nickel are illustrated and described in detail in Bacon United States Letters Patent No. 2,928,783 and, as pointed out therein, the oxygen cathode should be oxidized to produce a corrosion-resistant coating. The fine pore layer prevents the gases from bubbling into the electrolyte and the gases on the opposite side prevent the electrolyte from penetrating through the large pore layer. Catalysts are deposited in the porous layers to catalyze the reactions occurring thereat.

Generally, the conversion cells and fuel cell assemblies of the present invention are operated at a temperature of 25–250° centigrade and preferably 130–170° centigrade. The pressures employed may vary between about 1.0–5.0 atmospheres and are preferably 1.0–1.6 atmospheres.

The term "hydrogen-containing feedstocks" as used herein refers to hydrogen-containing compounds which may be reacted in the presence of a suitable catalyst and potential to produce hydrogen ions in accordance with the present invention. Exemplary of such compounds are saturated and unsaturated hydrocarbons, alcohols, aldehydes and other organic compounds, and ammonia.

Indicative of the operation of the present invention is the data set forth in the following specific examples:

EXAMPLE 1

A cell substantially as indicated in FIGURES 2 and 3 of the drawings is fabricated with a synthetic plastic housing utilizing an internal area of 5 centimeters x 5 centimeters. The anode is fabricated from a 50 mesh tantalum screen formed of wires 3 mils in thickness and 5 centimeters x 5 centimeters in dimension which has been coated with a platinum-black catalyst mixture to provide 25 milligrams per square centimeter thereof and a tetrafluoroethylene resin to provide 10 milligrams per square centimeter thereof. The coated anode is then sintered at 200 degrees centigrade to bond the catalyst and resin to the screen and to sinter the tetrafluoroethylene.

The cathode is fabricated from a membrane of a palladium alloy containing 25 percent silver which is activated by electro-depositing 2 milligrams per square centimeter of palladium-black on both sides thereof. The membrane is 3 mils in thickness and 5 centimeters in dimension.

The matrix member is a mat of quartz fibers approximately 30 mils in thickness and having a porosity of about 60 percent. Prior to assembly, the matrix member is soaked with an 85 percent by weight solution of phosphoric acid.

The gas mixture for conversion comprises moisture vapor at a partial pressure of 0.8 atmosphere and ethane at a partial pressure of 0.2 atmosphere and the flow is adjusted to produce a hydrocarbon conversion efficiency of 50 percent under the operating conditions of the cell. During the operation, the cell is maintained at a temperature of 150 degrees centigrade, and the voltage applied is 0.35 volt at 50 milliamperes per square centimeter.

Dry, substantially pure hydrogen is evolved from the cell at a rate of 12 to 16 centimeters per minute under the operating conditions.

EXAMPLE 2

A fuel cell assembly is constructed substantially as illustrated in FIGURE 4 of the attached drawing. In this device, a palladium-silver membrane of 3 mils in thickness is activated by electroplating 2 milligrams per square centimeter of platinum-black on both sides thereof and the upper electrode holder is dimensioned to expose a circular area of the membrane of about 10 square centimeters.

The anode is provided by a 50 mesh tantalum screen formed from wires 3 mils in thickness and is pasted with a mixture of platinum-black and tetrafluoroethylene resin to provide 25 milligrams per square centimeter and 10 milligrams per square centimeter thereof, respectively. The screen anode is pressed against the porous matrix member which is formed of quartz fibers and is about 30 mils in thickness by means of a spring formed of platinum-rhodium wire. In this fashion, the electrode is kept in contact with the quartz matrix member. The electrolyte provided within the main compartment is an 85 percent by weight solution of phosphoric acid.

In the upper electrode holder, there is provided an integral Bacon-type porous nickel cathode which has been activated with cobalt and which has an exposed active surface of 10 square centimeters. An electrolyte consisting of a 65 percent by weight potassium hydroxide solution is employed in the upper electrode holder.

The entire cell is maintained at a temperature of 150 degrees centigrade and scrubbed air at an overpressure of 0.6 atmosphere is fed to the Bacon-type cathode in the upper electrode holder at a flow rate to ensure 50 percent oxygen utilization at about 50 milliamperes per square centimeter. A gaseous mixture of hydrocarbon and moisture vapor in the ratio of 20:80 is fed to the anode of the lower electrode holder at an overpressure of 0.3 atmosphere with a flow rate to ensure 50 percent hydrocarbon conversion.

Before starting the run, a voltage of 300 millivolts is applied between the Bacon-type cathode and the palladium-silver membrane in the upper electrode compartment. The current flowing therebetween decays with time, indicating the saturation of the palladium-silver membrane with hydrogen. After this decay, a current of 0.5 ampere is applied between the Bacon-type cathode and the hydrocarbon anode of the lower electrode compartment with a cell voltage of 0.65 volt. During this time, a voltage of 300 millivolts between the hydrocarbon anode and the palladium-silver membrane was maintained which required a current flow of about 5 milliamperes between the hydrocarbon anode and palladium-silver membrane to replace hydrogen lost from the membrane by oxidation or evolution. If the voltage between the anode and the palladium-silver membrane is discontinued, the cell current decays to one-tenth of its value in five hours and continues to decay thereafter.

Thus, it can be seen from the foregoing detailed specification and the accompanying drawing that the present invention provides a novel electrochemical method and converter for generating hydrogen from hydrocarbons and other hydrocarbon-containing fuels which may be reacted efficiently in the presence of catalysts and current to yield hydrogen ions. The apparatus is relatively efficient and economical to operate and may be highly compact. It is capable of producing a relatively pure stream of hydrogen for use in fuel cells and the like, and, in accordance with one aspect of the invention, converter desirably is integrated with a fuel cell in a novel and highly effective manner to provide relatively pure hydrogen directly to the fuel cell reaction over extended periods of time.

Having thus described the invention, I claim:

1. In a fuel cell assembly, the combination comprising a housing; a porous anode having a dehydrogenation catalyst in the pores thereof and permeable to hydrogen ions formed thereat; a cathode membrane spaced from said anode and fabricated from metal selectively permeable to hydrogen; an acid electrolyte between said anode and cathode membrane; means in said housing for directing a gaseous reactant stream including a gaseous hydrogen-containing component into contact with said anode and said dehydrogenation catalyst therein to produce hydrogen and for discharging the unreacted portion of said stream and reaction products from adjacent said anode; means on said housing to the opposite side of said cathode membrane from said electrolyte for collecting and discharging hydrogen permeating through said cathode membrane; a cathode member spaced from said cathode membrane and to the opposite side thereof from said anode; an electrolyte between said cathode membrane and cathode member; electrical leads to said anode, cathode membrane and cathode member, said anode and cathode member being connected in an external circuit through a load to provide current flow therebetween as the result of the oxidation-reduction reactions occurring thereat; and a power source, said cathode membrane and one of said cathode member and anode being connected to said power source with said cathode membrane being the cathode in the circuit therewith to produce electron flow thereinto.

2. The combination of claim 1 wherein the metal of said cathode membrane is a palladium-silver alloy.

3. The combination of claim 1 wherein said porous anode has a first porous nickel layer in contact with said electrolyte and a second porous nickel layer spaced from said electrolyte, the pores of said second layer being larger than the pores of said first layer and having said dehydrogenation catalyst therein.

4. The combination of claim 1 wherein said electrolyte is included within an absorbent porous matrix member spacing said anode and cathode membrane from each other, said matrix member permitting flow of current and hydrogen ions therethrough and being contained within said housing.

5. The apparatus of claim 4 wherein said matrix member is cation-selective and permits only hydrogen ions to pass therethrough.

6. The combination of claim 1 wherein said porous anode is provided by a multiplicity of conductive wires forming a conductive screen with said dehydrogenation catalyst therebetween.

7. The combination of claim 4 wherein said matrix member is a mat of inorganic fibers inert to said electrolyte and to the electric current passing therethrough.

8. The combination of claim 1 wherein said housing includes a pair of members holding said anode and said cathode membrane firmly against said matrix member, said members having flow paths therein for movement of gas about the surface of said anode and cathode membrane.

9. A fuel cell assembly comprising a housing; an anode providing a dehydrogenation catalyst and permeable to hydrogen ion; a cathode membrane spaced from said anode and fabricated from a metal selectively permeable to hydrogen; an electrolyte between said anode and cathode membrane; a cathode member spaced from said cathode membrane and to the opposite side thereof from said anode; an electrolyte between said cathode membrane and cathode member; electrical leads to said anode, cathode membrane and cathode member, said anode and cathode member being connected in an external circuit through a load to provide current flow therebetween as the result of the oxidation-reduction reactions occuring thereat; and a power source, said cathode membrane and one of said cathode member and anode being connected to said power source with said cathode membrane being the cathode in the circuit therewith to produce electron flow thereinto.

10. The fuel cell assembly in accordance with claim 9 wherein said anode and cathode membrane are connected to said power source.

11. The fuel cell assembly in accordance with claim 9 wherein the metal of said cathode membrane is a palladium-silver alloy.

12. The fuel cell assembly in accordance with claim 9 wherein said first-mentioned electrolyte is included within an absorbent porous matrix member spacing said cathode membrane and anode from each other, said matrix member permitting flow of current and hydrogen ions therethrough.

13. The fuel cell assembly in accordance with claim 9 wherein said anode is provided by a multiplicity of conductive wires forming a conductive screen with a dehydrogenation catalyst therebetween.

14. A fuel cell assembly comprising an anode provided by a multiplicity of conductive wires forming a screen with a dehydrogenation catalyst therebetween; a cathode membrane fabricated from a palladium alloy selectively permeable to hydrogen; an electrolyte between said anode and cathode membrane; an absorbent porous matrix member between said cathode membrane and anode; electrolyte saturating said matrix member and providing an ionic path therethrough; a cathode member spaced from said cathode membrane; an electrolyte between said cathode membrane and cathode member; electrical leads to said anode, cathode membrane and cathode member, said anode and cathode member being connected in an external circuit through a load to provide current flow therebetween as the result of the oxidation-reduction reactions occurring thereat; a housing encasing the aforementioned elements and providing a conduit for a hydrogen-containing feedstock mixture to said anode and a conduit for an oxygen-containing gas to said cathode member; and a power source, said cathode membrane and one of said cathode member and anode being connected to said power source with said cathode membrane being the cathode in the circuit therewith to produce electron flow thereinto to compensate for hydrogen loss in said cathode membrane.

15. The fuel cell assembly in accordance with claim 14 wherein said anode and cathode membrane are connected to said power source.

16. In a method for electrochemically producing electrical energy, the steps comprising: passing a gaseous mixture including a hydrogen-containing feedstock into contact with an anode providing a dehydrogenation catalyst to produce hydrogen ions therefrom; causing said hydrogen ions to pass through an electrolyte to a cathode membrane of a metal selectively permeable to hydrogen and to be absorbed thereon and to be reduced by flowing a current between said anode and cathode membrane from an external source of current; causing the resultant hydrogen to diffuse through said membrane to an alkaline electrolyte; passing oxygen into contact with a cathode member spaced from said cathode membrane to produce hydroxyl ions at said cathode member in said alkaline electrolyte; and coupling said anode and cathode member through an external circuit providing a load to cause oxidation of the hydrogen diffusing through said membrane and convert the energy of the chemical reaction to electrical energy.

17. The method of claim 16 wherein the metal of said membrane is a palladium-silver alloy.

18. The method of claim 16 wherein said mixture is comprised of a hydrocarbon and water vapor.

References Cited

UNITED STATES PATENTS

| | | | |
|---|---|---|---|
| 2,928,783 | 3/1960 | Bacon | 136—86 X |
| 3,113,080 | 12/1963 | Andrus. | |
| 3,124,520 | 3/1964 | Juda | 136—86 |
| 3,180,813 | 4/1965 | Wasp et al. | 136—86 X |
| 3,259,524 | 7/1966 | Fay et al. | 136—86 |
| 3,291,643 | 12/1966 | Oswin et al. | 136—86 |
| 3,301,773 | 1/1967 | Whitney | 204—1 |
| 3,305,403 | 2/1967 | Corso et al. | 136—86 X |

FOREIGN PATENTS

| | | |
|---|---|---|
| 1,166,831 | 11/1958 | France. |
| 1,322,702 | 2/1963 | France. |
| 1,383,637 | 11/1964 | France. |
| 871,950 | 10/1959 | Great Britain. |
| 973,810 | 10/1964 | Great Britain. |

ALLEN B. CURTIS, *Primary Examiner.*

U.S. Cl. X.R.

204—1